May 7, 1940.  E. M. FULKERSON ET AL  2,200,165
MOTOR TRUCK LIME SPREADER
Filed Dec. 1, 1938  2 Sheets-Sheet 1
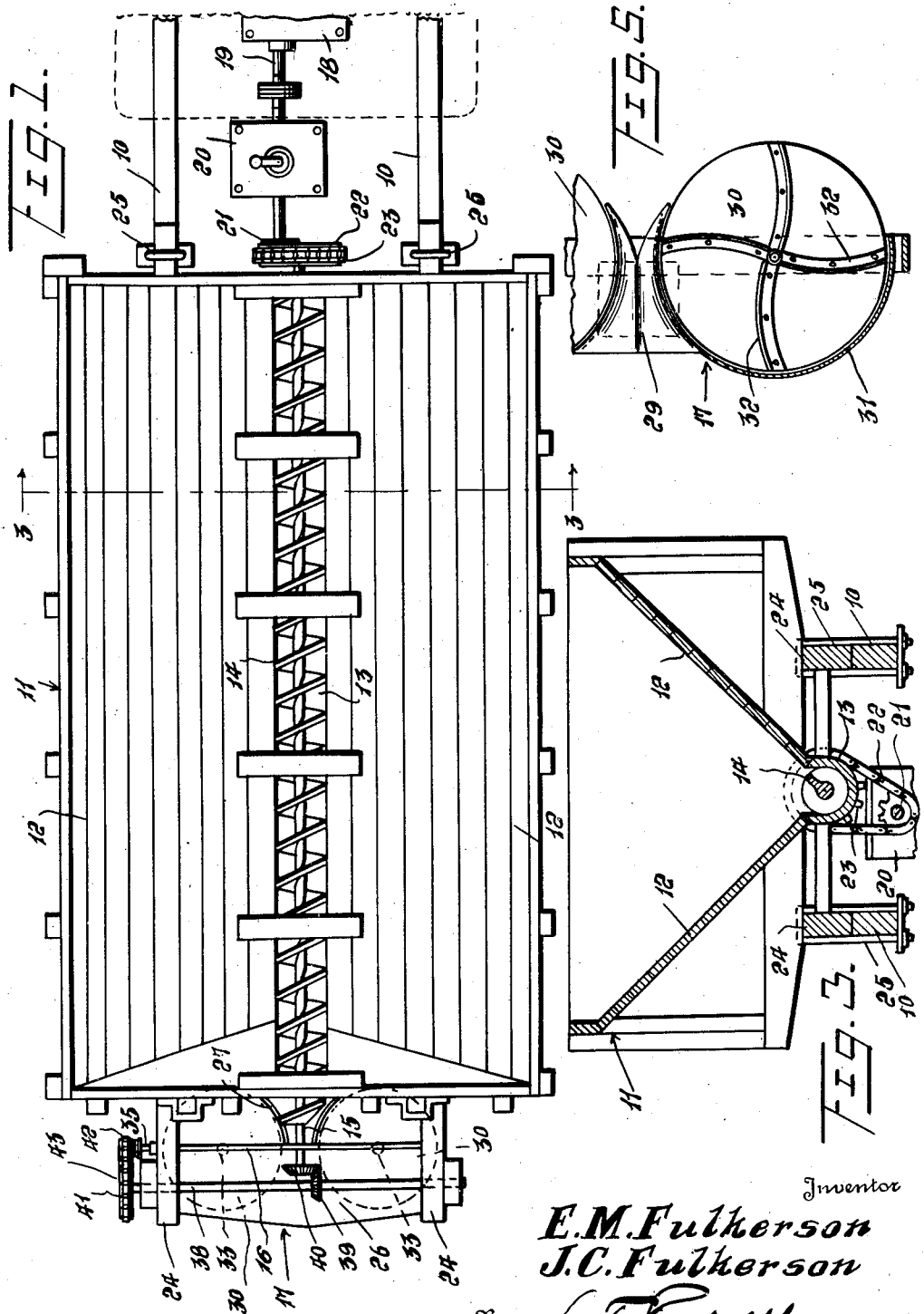
Inventor
E. M. Fulkerson
J. C. Fulkerson
By L. F. Landreth
Attorney

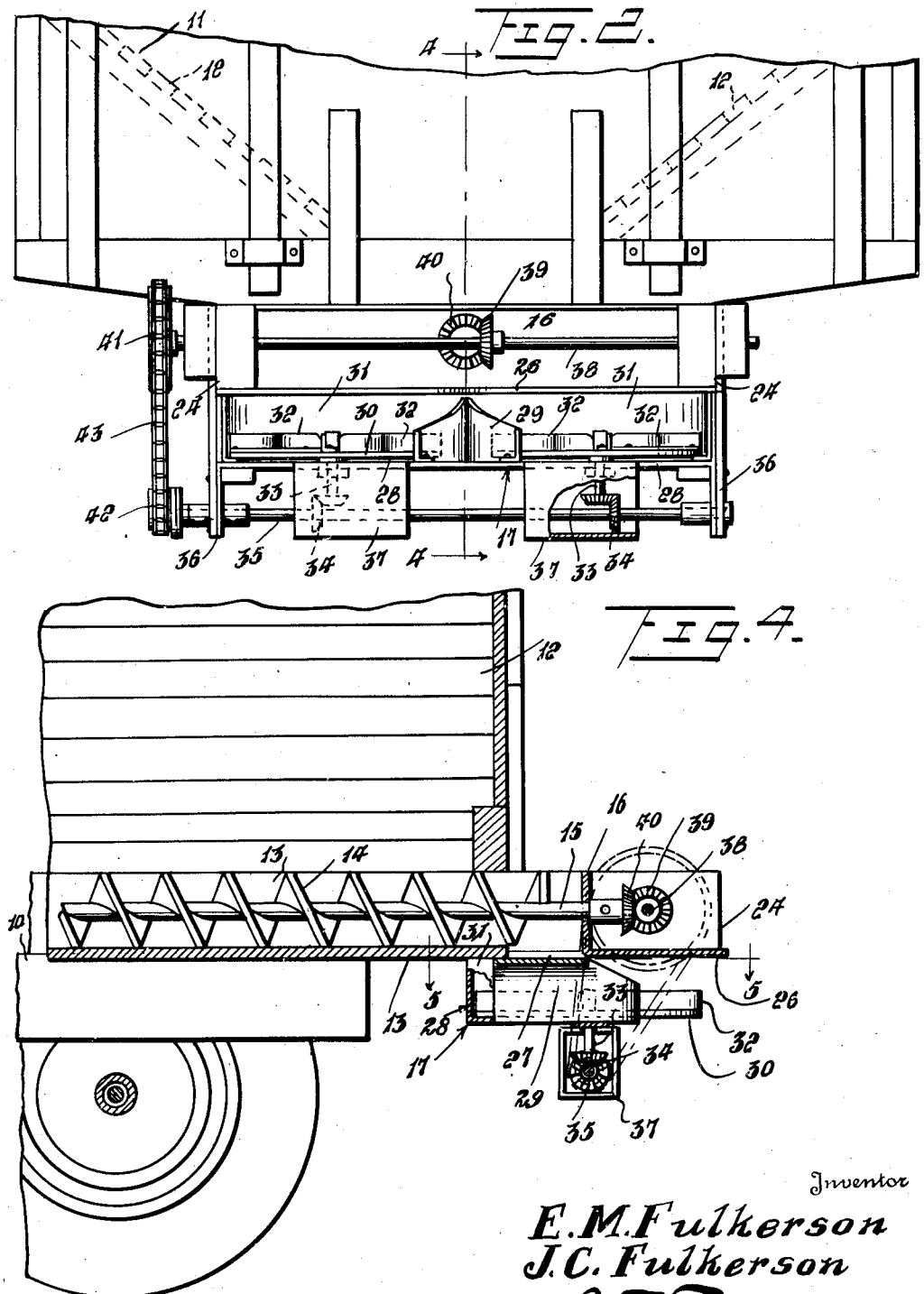

Patented May 7, 1940

2,200,165

REISSUED
FEB 10 1942

UNITED STATES PATENT OFFICE 2,200,165

MOTOR TRUCK LIME SPREADER

Elmer M. Fulkerson and Jesse C. Fulkerson,
Sonora, Ky.

Application December 1, 1938, Serial No. 243,469

2 Claims. (Cl. 275—8)

This invention relates to a spreader and it particularly aims to provide a novel structure adapted to be carried by a truck and operated from its propelling motor, and especially such a spreader as may be used in connection with lime, marl and other fertilizer or material.

More specific objects and advantages will become apparent from a consideration of the description following taken in connection with the accompanying drawings illustrating an operative embodiment.

In said drawings:

Figure 1 is a plan view, partly broken away, illustrating our improvements;

Figure 2 is a rear elevation thereof partly broken away;

Figure 3 is a vertical sectional view taken on the plane of line 3—3 of Figure 1;

Figure 4 is a longitudinal sectional view taken on the plane of line 4—4 of Figure 2; and Figure 5 is a horizontal sectional view taken on the plane of line 5—5 of Figure 4.

Referring specifically to the drawings wherein like reference characters designate like or similar parts, the invention is applied to a self-propelled truck body in which the side beams of the chassis are shown as at 10. Mounted in any suitable manner on said side beams or otherwise on the truck, is a hopper 11 adapted to contain the lime, marl or other material to be distributed. As best shown in Figure 3, the hopper has inclined side walls as at 12 converging at a central bottom trough 13 in which a screw conveyor 14 is operatively disposed in order to move the lime or other material to the rear of the truck hopper 11, for discharge thereof. The conveyor 14 has a shaft 15 journaled in the front end wall of the hopper and in the vertical wall 16 extending transversely and carried by a spreader structure generally designated 17 and located at the rear of the hopper.

The conveyor 14 and other parts are preferably driven from the propelling motor of the truck, the same or transmission being suggested at 18 having a power take-off shaft 19 leading therefrom and including a suitable change speed gear mechanism as at 20. Said shaft 19 at the rear of the change speed mechanism or box 20 has a sprocket wheel 21 keyed thereto over which a sprocket chain 22 is trained and which is also trained over a sprocket wheel 23 keyed to the keyed shaft 15.

Reverting to the spreader mechanism 17, it is preferably built onto and carried by the beams used to secure the hopper 11 removably to the chassis 10. Such means consist of side beams 24 which are rigidly attached to the hopper 11 and removably rest on the side beams 10, being fastened thereto in any suitable manner as by means of U-bolts or clamps as at 25. A plate 26 is fastened to the under surface of those portions of beams 24 which project to the rear of the hopper 11, and a discharge opening is provided at 27 in such plate so that material fed by the screw 14 will fall through the opening 27, since it will abut and can not travel past the wall or partition 16 previously referred to.

A pan or the like 28 is suspended below the beams 24 and connected to the portions thereof in the rear of the hopper. Mounted on the pan and disposed centrally thereof directly beneath the opening 27, is a divider 29, serving to divide the material reaching the same and guide it to a pair of spreaders 30. Such spreaders 30 are located within the pan 28. A vertical wall 31 surrounds the pan at the sides and front and the pan on opposite sides of the divider 29 extends forwardly slightly beyond the divider as best shown in Figures 4 and 5. The former figure showing the divider in central longitudinal section. Said pan 28 is open at the rear in event the spreaders may discharge or broadcast the material. Such spreaders are rotatable and preferably have flights 32 thereon to facilitate engagement with and discharge of the material. Such spreaders 30 are generally in the form of round rotatable plates or disks and they have depending shafts 33 journaled in the bottom wall of the pan 28. At the lower ends of the shafts 33, gear wheels 34 are keyed which are enmeshed with bevelled gear wheels 34 keyed to a transverse shaft 35 journaled in suitable bearings 36 depending from the pan 28. Hoods or guards 37 secured to the pan are used to protect the gearing 33 and 34 against the material being discharged.

Parallel with shaft 35 and journaled in the upper portion of the aforesaid bearings 36, is a shaft 38, the same also passing through the rear portions of the beams 24. Shaft 38 has a bevelled gear wheel 39 keyed thereto and enmeshed with a bevelled gear wheel 40 located at the rear end of the shaft 15. Bevelled gear wheels at 41 and 42, are respectively keyed to the shafts 38 and 35 and a sprocket chain 43 traverses the same so as to operate the spreaders from the shaft 19.

It will be realized that the device is driven by the operating motor or mechanism of the truck and the same in effect forms a unit which may be applied to the chassis of the truck, the driving mechanism and power take-off being detachably connected in any suitable way from a propeller shaft or other shaft of the motor of the truck.

Various changes may be resorted to provided they fall within the spirit and scope of the invention.

We claim as our invention:

1. A device of the class described comprising a hopper having attaching beams, a conveyor in said hopper, means to drive the conveyor, said beams having portions extending rearwardly beyond the hopper, a plate secured to said portions having an opening through which the conveyor discharges material, a pan secured to said portions to receive said material, an abutment partition secured to said portions at the rear of said opening constituting a bearing for the conveyor, spreader means on said pan, means to drive the spreader means operatively connected to the conveyor at the rear of said partition comprising parallel shafts, means gearing the shafts together, means to drive the spreader means from one of the shafts, and means at the sides of the pan extending above and below it and serving as bearings for both of said parallel shafts.

2. A device of the class described comprising a hopper having attaching beams, a conveyor in said hopper, means to drive the conveyor, said beams having portions extending rearwardly beyond the hopper, a plate secured to said portions having an opening through which the conveyor discharges material, a pan secured to said portions to receive said material, an abutment partition secured to said portions at the rear of said opening constituting a bearing for the conveyor, spreader means on said pan, means to drive the spreader means operatively connected to the conveyor at the rear of said partition comprising parallel shafts, means gearing the shafts together, gearing to rotate the spreader means from one of the shafts, and means at the sides of the pan extending above and below it and serving as bearings for both of said parallel shafts, guards for said gearing, and a divider for the material disposed below the said opening and in said pan.

ELMER M. FULKERSON.
JESSE C. FULKERSON.